US012658522B2

(12) United States Patent
Shi et al.

(10) Patent No.: US 12,658,522 B2
(45) Date of Patent: Jun. 16, 2026

(54) TOP COVER ASSEMBLY, BATTERY CELL, BATTERY AND ELECTRICAL APPARATUS

(71) Applicant: CONTEMPORARY AMPEREX TECHNOLOGY (HONG KONG) LIMITED, Hong Kong (CN)

(72) Inventors: Guangda Shi, Ningde (CN); Ying Li, Ningde (CN); Jinghao Guo, Ningde (CN); Yazhi Cai, Ningde (CN); Qingkui Chi, Ningde (CN); Libin Zhong, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 518 days.

(21) Appl. No.: 18/446,365

(22) Filed: Aug. 8, 2023

(65) Prior Publication Data

US 2023/0395929 A1 Dec. 7, 2023

Related U.S. Application Data

(63) Continuation of application No. PCT/CN2022/116727, filed on Sep. 2, 2022.

(30) Foreign Application Priority Data

Oct. 25, 2021 (CN) .......................... 202122577576.0

(51) Int. Cl.
  *H01M 50/325* (2021.01)
  *H01M 10/48* (2006.01)
  (Continued)

(52) U.S. Cl.
  CPC ....... *H01M 50/325* (2021.01); *H01M 10/486* (2013.01); *H01M 50/15* (2021.01);
  (Continued)

(58) Field of Classification Search
  None
  See application file for complete search history.

(56) References Cited

FOREIGN PATENT DOCUMENTS

CN 201570531 U 9/2010
CN 103474599 B 8/2018
  (Continued)

OTHER PUBLICATIONS

The World Intellectual Property Organization (WIPO) International Search Report for PCT/CN2022/116727 Nov. 30, 2022 6 pages (English translation included).

(Continued)

*Primary Examiner* — Carlos Barcena
(74) *Attorney, Agent, or Firm* — ANOVA LAW GROUP, PLLC

(57) ABSTRACT

A top cover assembly includes a top cover, a connecting element, and a pressure relief valve. The top cover is configured to be connected to a case of the battery cell and provided with a through hole. The connecting element is arranged on the top cover and provided with an installation hole communicating with the through hole and a first channel extending to the outside from a hole wall of the installation hole. An opening, communicating with the outside, of the first channel is provided with a first gas permeable membrane. The pressure relief valve is arranged in the installation hole, is configured to slide in the installation hole under a pressure, and is provided with a second channel.

12 Claims, 4 Drawing Sheets

(51) Int. Cl.
| | |
|---|---|
| *H01M 50/15* | (2021.01) |
| *H01M 50/30* | (2021.01) |
| *H01M 50/367* | (2021.01) |
| *H01M 50/392* | (2021.01) |
| *H01M 50/55* | (2021.01) |

(52) U.S. Cl.
CPC ....... *H01M 50/367* (2021.01); *H01M 50/394* (2021.01); *H01M 50/55* (2021.01); *H01M 50/392* (2021.01); *H01M 2220/20* (2013.01)

(56) References Cited

FOREIGN PATENT DOCUMENTS

| | | | |
|---|---|---|---|
| CN | 208173680 | U | 11/2018 |
| CN | 212810475 | U | 3/2021 |
| CN | 216980710 | U | 7/2022 |
| EP | 3706194 | A1 | 9/2020 |
| JP | 2019102190 | A | 6/2019 |

OTHER PUBLICATIONS

The European Patent Office (EPO). The Partial Supplementary European Search Report for Application No. 22885415.4 Jul. 17, 2024 13 Pages.

TOP COVER ASSEMBLY, BATTERY CELL, BATTERY AND ELECTRICAL APPARATUS

CROSS-REFERENCE TO RELATED APPLICATION

The present application is a continuation of International Application No. PCT/CN2022/116727, filed on Sep. 2, 2022, which claims the priority to Chinese Patent Application No. 202122577576.2 filed on Oct. 25, 2021 and entitled "TOP COVER ASSEMBLY, BATTERY CELL, BATTERY AND ELECTRICAL APPARATUS", the entire contents of which are incorporated herein by reference.

TECHNICAL FIELD

The embodiments of the present application relate to the technical field of battery production, and in particular to a top cover assembly, a battery cell, a battery and an electrical apparatus.

BACKGROUND

As an important energy source in daily life, batteries have the characteristics of high capacity and long cycle life. At present, the widely used batteries are mainly lithium-ion batteries. The lithium-ion batteries have significant advantages in terms of operating voltage, energy density, cycle life, etc. However, during the use of the lithium-ion batteries, gas will be generated inside, causing the internal pressure of the batteries to rise continuously. If the pressure is not released in time, the batteries will explode.

In order to enable the pressure in the battery to be released in time, a pressure relief apparatus is usually designed on a top cover of a battery cell, which can realize automatic pressure relief after the pressure inside the battery cell reaches a certain value. However, the pressure relief apparatus used in the battery cell at present has the problem of insufficient airtightness, and an electrolyte solution inside the battery cell can easily flow out of the cell from the pressure relief apparatus, resulting in battery leakage.

SUMMARY

The objective of the embodiments of the present application is to provide a top cover assembly, a battery, a battery cell and an electrical apparatus, which can ensure airtightness at a pressure relief apparatus and prevent an electrolyte solution inside the battery cell from easily flowing out of the cell from the pressure relief apparatus and causing battery leakage.

The embodiment of the present application provides a top cover assembly, including a top cover, connecting elements and pressure relief valves. The top cover is used for being connected to a case of a battery cell and provided with through holes; the connecting elements are arranged on the top cover and each provided with an installation hole communicating with the corresponding through hole and a first channel extending to the outside from a hole wall of the installation hole, and an opening, communicating with the outside, of each first channel is provided with a first gas permeable membrane; the pressure relief valves are arranged in the installation holes, can slide in the installation holes under the pressure action, and are each provided with a second channel, one end of each second channel communicates with the side, away from the corresponding connecting element, of the top cover, and the other end of each second channel can be switched between a seal state and a pressure relief state; in the seal state, the other end of each second channel and the opening, in the hole wall of the corresponding installation hole, of the corresponding first channel are staggered; and in the pressure relief state, the other end of each second channel communicates with the opening, in the hole wall of the corresponding installation hole, of the corresponding first channel so as to release pressure to the outside.

The embodiment of the present application further provides a battery cell, including a case, an electrode assembly and the top cover assembly in the above embodiment. The case has an inner cavity and an opening communicating with the inner cavity, the electrode assembly is arranged in the inner cavity, and the top cover of the top cover assembly is connected to the case and closes the opening.

The embodiment of the present application further provides a battery, including the battery cell in the above embodiment.

The embodiment of the present application further provides an electrical apparatus, including the battery in the above embodiment.

In some embodiments, the first channel includes a first discharge section and a second discharge section communicating with each other. The first discharge section communicates with the installation hole and extends in a direction perpendicular to a central axis of the installation hole, and the second discharge section is used for communicating with the outside, and extends in a direction parallel to the central axis of the installation hole. In this way, the opening in one end of the first channel faces the central axis of the installation hole, and the opening in the other end of the second channel faces the side, away from the top cover, of the connecting element.

In some embodiments, the connecting element is provided with a fixing hole communicating with the first discharge section, and a temperature sensing element is arranged in the fixing hole. In this way, when the pressure relief valve and the connecting element are in the pressure relief state, the temperature of gas flowing out from the first channel is sensed, and signals are transmitted to a control system in the battery so that the electrical apparatus can receive a battery temperature abnormal signal to monitor thermal runaway of the battery.

In some embodiments, the second channel includes a first pressure relief section and a second pressure relief section communicating with each other, the first pressure relief section further communicates with the side, away from the connecting element, of the top cover and extends in a direction parallel to the central axis of the installation hole, and the second pressure relief section extends in a direction perpendicular to the central axis of the installation hole. In this way, the opening in one end of the second channel can face the side, away from the connecting element, of the top cover, and the opening in the other end of the second channel is arranged away from the central axis of the installation hole.

In some embodiments, the top cover assembly further includes elastic members, one end of each elastic member is connected to the hole wall, away from the top cover, of the corresponding installation hole, and the other end of each elastic member is connected to the corresponding pressure relief valve. In this way, the pressure relief valve can automatically return to the original position after moving under the pressure action, thereby realizing automatic pressure relief of the battery cell.

In some embodiments, the pressure relief valve includes a main body part and a protruding part which are connected; and the installation hole includes a first hole wall surface, a stepped surface and a second hole wall surface which are distributed in an axial direction, the main body part is slidably connected to the first hole wall surface, the protruding part is slidably connected to the second hole wall surface, and the stepped surface is used for limiting a sliding position of the protruding part. In this way, the main body part can be matched with the first hole wall surface, the protruding part can be matched with the second hole wall surface, and the stepped surface can be used for limiting the protruding part to only slide on the first hole wall surface.

In some embodiments, the top cover assembly further includes terminal posts, the top cover is provided with terminal post holes, the through holes are adjacent to the terminal post holes, and the terminal posts penetrate through the terminal post holes and are riveted to the connecting elements. In this way, the through hole in the connecting element is adjacent to the terminal post hole in the top cover so that a fixing basis can be provided for the arrangement of the terminal post on the top cover, that is, the terminal post can penetrate through the terminal post hole in the top cover to be riveted to the connecting element, thereby fixing the terminal post to the top cover.

In some embodiments, the top cover assembly further includes first plastic parts, the first plastic parts are arranged between the connecting elements and the top cover and provided with first via holes for the terminal posts to penetrate through and second via holes for the pressure relief valves to penetrate through. In this way, by arranging the first plastic parts, the airtightness at contact positions between the connecting elements and the top cover can be ensured.

In some embodiments, the top cover assembly further includes second plastic parts, the second plastic parts are arranged on the sides, away from the connecting elements, of the top cover, and the second plastic parts are provided with third via holes for the terminal posts to penetrate through and fourth via holes communicating with the through holes. In this way, by arranging the second plastic parts, the airtightness at the sides, away from the connecting elements, of the top cover can be ensured.

In some embodiments, a second gas permeable membrane is arranged in the fourth via hole. In this way, it can be ensured that the electrolyte solution cannot flow from the fourth via hole of the second plastic part into the through hole of the top cover.

Beneficial Effects

According to the top cover assembly, the battery cell, the battery and the electrical apparatus provided by the embodiments of the present application, by arranging a channel-form pressure relief structure in the top cover assembly, airtightness of assembly gaps between the pressure relief valve and the connecting element can be ensured so that the electrolyte solution cannot easily flow out from the assembly gaps between the pressure relief valve and the connecting element, thereby ensuring the airtightness at the pressure relief apparatus; and meanwhile, the first gas permeable membrane arranged at the opening, communicating with the outside, of the first channel can prevent the electrolyte solution in the battery cell from flowing out along the first channel when the gas is discharged, and accordingly battery leakage caused when the electrolyte solution in the battery cell flows out of the cell from the pressure relief apparatus is prevented.

BRIEF DESCRIPTION OF DRAWINGS

One or more embodiments are exemplified by corresponding figures in the drawings, and these exemplifications do not limit the embodiments. Components with the same reference numerals in the drawings represent similar components. Unless otherwise stated, the figures in the drawings are not limited to scale.

DESCRIPTION OF REFERENCE NUMERALS

Figure 1:
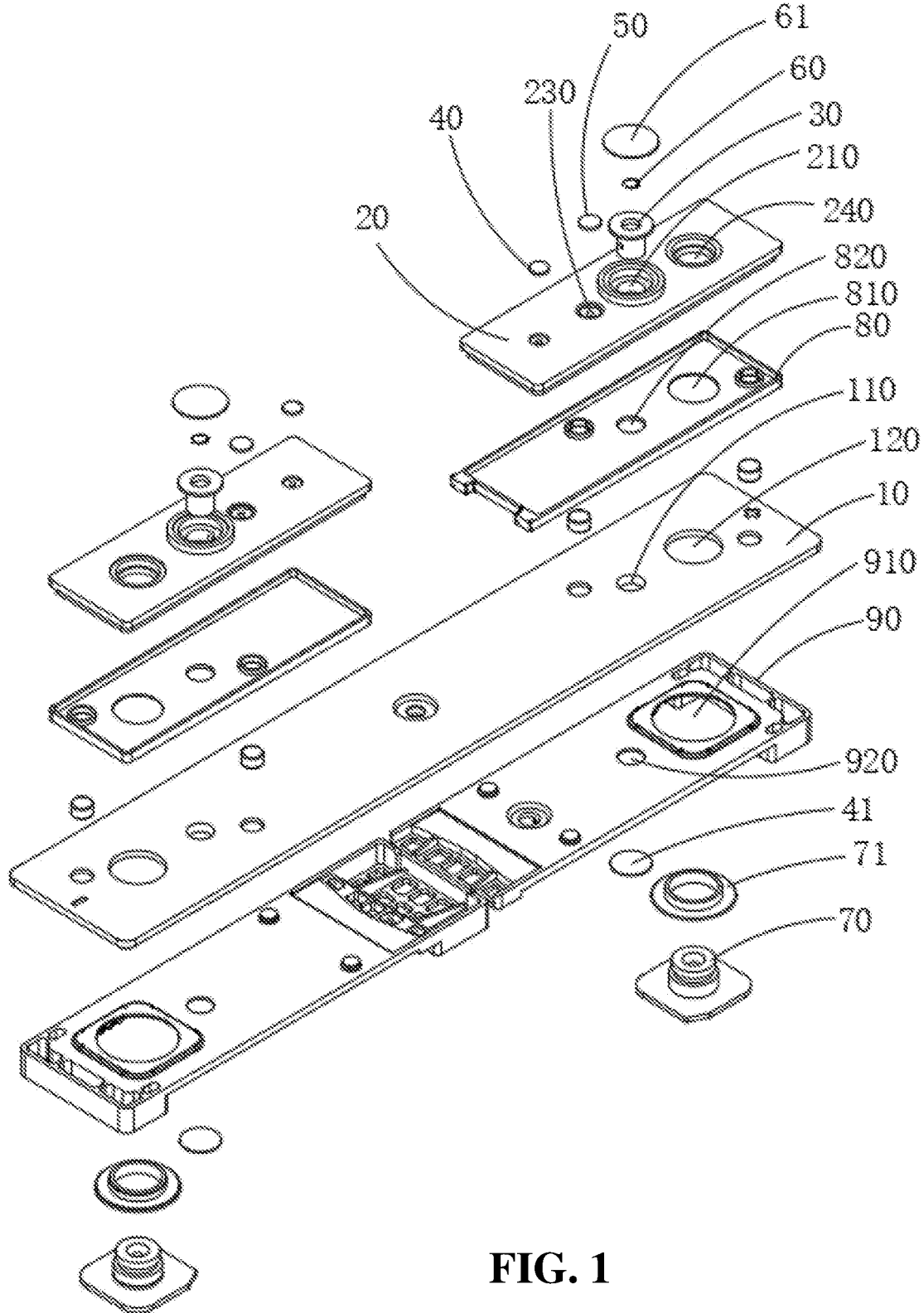
FIG. 1 is an exploded structural schematic diagram of a top cover assembly provided in an embodiment of the present application.
Figure 2:
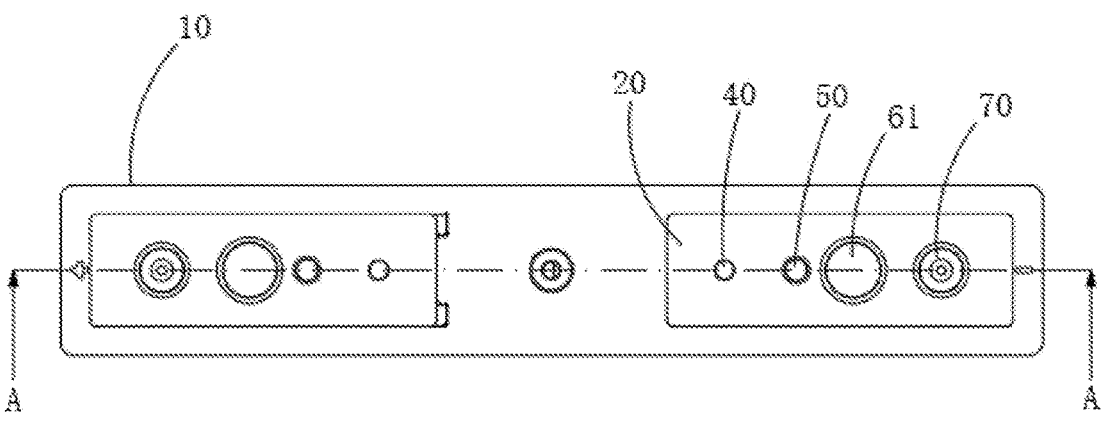
FIG. 2 is an overhead structural schematic diagram of a top cover assembly provided in an embodiment of the present application.
Figure 3:
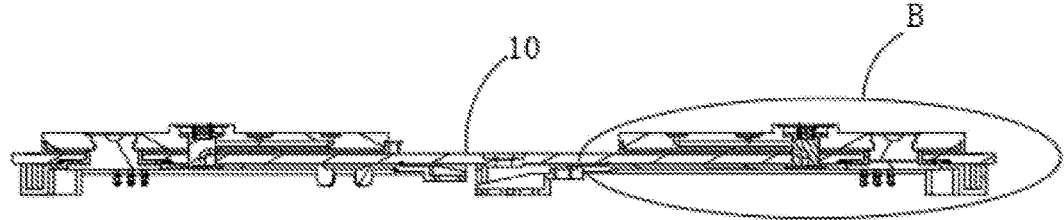
FIG. 3 is a section structural schematic diagram of a top cover assembly in an A-A direction in FIG. 2 when a pressure relief valve is used for a seal state.

10—top cover; 110—through hole; 120—terminal post hole;

20—connecting element; 210—installation hole; 211—first hole wall surface; 212—stepped surface; 213—second hole wall surface; 220—first channel; 221—first discharge section; 222—second discharge section; 230—fixing hole; 240—rivet hole;

30—pressure relief valve; 310—second channel; 311—first pressure relief section; 312—second pressure relief section; 320—main body part; 330—protruding part;

40—first gas permeable membrane; 41—second gas permeable membrane;

50—temperature sensing element;

60—elastic member; 61—sealing member;

70—terminal post;

80—first plastic part; 810—first via hole; 820—second via hole;

90—second plastic part; 910—third via hole; and 920—fourth via hole.

DETAILED DESCRIPTION

Embodiments of the technical solutions of the present application will be described in detail below in conjunction with the drawings. The following embodiments are only used to more clearly illustrate the technical solutions of the present application, and therefore are only used as examples but cannot be used to limit the scope of protection of the present application.

Unless otherwise defined, all technical and scientific terms used herein have the same meaning as commonly understood by those of ordinary skill in the art belonging to the technical field of the present application; the terms used herein are only for the purpose of describing the specific embodiments and are not intended to limit the present application; the terms "including" and "having" and any variations thereof in the specification and the claims of the present application and in the description of the drawings above are intended to cover non-exclusive inclusion.

In the description of the embodiments of the present application, the technical terms "first", "second", etc. are used only to distinguish different objects, but not to be understood as indicating or implying a relative importance or implicitly specifying the number, particular order, or primary and secondary relationship of the indicated technical features. In the description of the embodiments of the present application, the meaning of "a plurality of" is two or more, unless otherwise explicitly and specifically defined.

A references herein to "an embodiment" means that a particular feature, structure, or characteristic described in combination with the embodiment can be included in at least one embodiment of the present application. The appearance of this phrase in various places in the specification does not necessarily refer to the same embodiment, nor is it a separate or alternative embodiment that is mutually exclusive from other embodiments. It is explicitly and implicitly understood by those skilled in the art that the embodiments described herein may be combined with other embodiments.

In the description of the embodiments of the present application, the term "and/or" is only an association relationship for describing associated objects, indicating that there may be three relationships, for example, A and/or B may represent three situations: A exists alone, both A and B exist, and B exists alone. In addition, the character "/" herein generally means that the associated objects before and after it are in an "or" relationship.

In the description of the embodiments of the present application, the term "a plurality of" refers to two or more (including two), and similarly, "multiple groups" refers to two or more groups (including two groups), and "multiple sheets" refers to two or more sheets (including two sheets).

In the description of the embodiments of the present application, the orientation or position relationship indicated by the technical terms "center", "longitudinal", "transverse", "length", "width", "thickness", "upper", "lower", "front", "back", "left", "right", "vertical", "horizontal", "top", "bottom", "inner", "outer", "clockwise", "anticlockwise", "axial direction", "radial direction", "circumferential direction", etc. are based on the orientation or position relationship shown in the drawings and are intended to facilitate the description of the embodiments of the present application and simplify the description only, rather than indicate or imply that an apparatus or assembly referred to must have a particular orientation or be constructed and operated in a particular orientation, and therefore are not to be understood as limitations on the embodiments of the present application.

In the description of the embodiments of the present application, unless otherwise expressly specified and limited, the technical terms "mount", "join", "connect", "fix", etc. should be understood in a broad sense, such as, a fixed connection, or a detachable connection, or an integrated connection; a mechanical connection, or an electrical connection; a direct connection, or an indirect connection through an intermediate medium, or internal communication of two assemblies, or interaction between two assemblies. Those of ordinary skill in the art can understand the specific meanings of the above terms in the embodiments of the present application according to specific situations.

Lithium-ion batteries have become extremely important in present energy crisis, which can meet the needs of people for modern green and environment-friendly life. However, during the use of the lithium-ion batteries, the electrolyte solution inside battery cells will be decomposed and generate gas, which will cause the internal air pressure of the battery cells to rise, and in severe situations, the batteries will explode. Therefore, a pressure relief apparatus is usually designed at a top cover of the battery cell.

The battery cell generally includes a case, an electrode assembly, electrode terminals, the top cover, etc. The case of the battery cell is a part for accommodating the electrode assembly, the top cover of the battery cell is a part for closing the case of the battery cell, and the top cover covers an opening of the case so as to isolate an internal environment of the battery cell from an external environment. The electrode assembly is arranged inside the case, and is electrically connected to the electrode terminals through adapter parts. The electrode terminals are exposed outside the battery cell and are used for electrical connection with an external circuit. The electrode assembly is a winding core inside the battery cell, which is a part where electrochemical reaction occurs in the battery cell, and is located inside the case. The electrode assembly is formed by stacking or winding a first pole piece, a second pole piece and an insulating membrane between the first pole piece and the second pole piece. One of the first pole piece and the second pole piece is a positive pole piece, and the other is a negative pole piece. The parts, with active materials, of the positive pole piece and the negative pole piece constitute a main body of the electrode assembly, and the parts, without the active materials, of the positive pole piece and the negative pole piece respectively constitute tabs, and the positive pole piece tab and the negative pole piece tab can be located at one end of the main body or at two ends of the main body respectively. During the charging and discharging process of the battery, the active material of the positive pole piece and the active material of the negative pole piece react with the electrolyte solution, and the tabs can facilitate electrical connection between the winding core and the electrode terminals to form a current loop. The electrode terminals are parts for the battery cell to transmit electric energy to the outside, and the adapter parts are parts for electrically connecting the electrode assembly to the electrode terminals in the battery cell.

At present, there are mainly two types of pressure relief devices commonly used in the lithium-ion batteries. One is to process a notch with a certain depth on a surface of the top cover of the battery cell. The notch here is a weak portion processed in the top cover of the battery cell. When the internal air pressure of the battery cell rises to a certain degree, that is, the limit pressure borne by the notch is reached, the notch will automatically crack to reduce the pressure, so as to prevent the battery cell from exploding due to the increased internal air pressure. The other is to process a safety valve on the top cover of the battery cell. The safety valve usually includes a valve body installed on the top cover of the battery cell and a valve core located in the valve body. The valve core is installed in the valve body through a spring. An exhaust vent is processed in the valve body. When the internal pressure of the battery cannot cause elastic deformation of the spring, the valve core of the safety valve can isolate the exhaust vent in the valve body from a cell inside the battery cell. When the internal pressure of the battery cell causes the elastic deformation of the spring, the valve core of the safety valve leaves an isolation state, and the internal environment of the cell of the battery cell can communicate with the exhaust vent in the valve body of the safety valve, and accordingly, the effect of pressure relief can be achieved.

However, the applicant noticed that a first pressure relief form used in the battery cell is a self-destructive pressure relief form, that is, the notch in the top cover of the battery cell can only be used once, and the effect is not good in actual use; although a second pressure relief form can realize automatic pressure relief, a gap between the valve core of the safety valve and the valve body is too large after the valve core leaves the isolation state, resulting in that air-tightness between the valve core and the valve body cannot be guaranteed, the electrolyte solution inside the battery cell can easily flow out from the gap between the valve core of the safety valve and the valve body, and then flow out from the exhaust vent in the valve body, causing battery leakage. Especially in some safety valves, in order to reduce resistance of the valve core during movement, the contact area between the valve core and the valve body is reduced, and line contact is adopted, which will seriously weaken the airtightness between the valve core and the valve body.

In order to ensure the airtightness at the pressure relief apparatus, the applicant found that the pressure relief apparatus may take the form of a channel for pressure relief, that is, a pressure relief channel that can be connected and disconnected is processed in the pressure relief apparatus, when the pressure relief channel is in a connected state, gas inside the battery can be discharged along the pressure relief channel in time, and when the pressure relief channel is in a disconnected state, the airtightness at the pressure relief apparatus can be well guaranteed. At the same time, a gas permeable membrane is installed at an opening of the pressure relief channel, which is used to ensure that the electrolyte solution will not flow out along the pressure relief channel.

When the battery cell adopts the top cover assembly with the pressure relief apparatus, the airtightness at the pressure relief apparatus can be ensured under the condition of realizing the automatic pressure relief of the battery cell, that is, the gas will flow out along the pressure relief channel rather than flow out from assembly gaps of parts of the pressure relief apparatus. Since the pressure relief apparatus adopts the form of the channel for pressure relief, the electrolyte solution will not easily flow out from the assembly gaps in the pressure relief apparatus, the gas permeable membrane installed at the opening of the pressure relief channel can prevent the electrolyte solution inside the battery cell from flowing out along the pressure relief channel when the gas is discharged, and thus, airtightness is good.

The gas permeable membrane here is a permeable membrane that allows the gas to pass through but blocks liquid.

The top cover assembly provided by the embodiment of the present application may be, but is not limited to be, used for a lithium ion secondary battery, a lithium ion primary battery, a lithium sulfur battery, a sodium ion battery, or a magnesium ion battery, etc., which is not limited in the embodiment of the present application. The battery cell may be a cylinder, a flat solid, a cuboid or another shape, which is also not limited in the embodiment of the present application.

Here, the top cover assembly for the flat battery cell is used as an example for illustration. As shown in FIGS. 1 to 6, the top cover assembly provided by the embodiment of this application includes a top cover 10, connecting elements 20 and pressure relief valves 30. The top cover 10 is used for being connected to the case of the battery cell, and provided with through holes 110; the connecting elements 20 are arranged on the top cover 10 and provided with installation holes 210 communicating with the through holes 110 in the top cover 10 and first channels 220 extending to the outside from hole walls of the installation holes 210, and openings, communicating with the outside, of the first channels 220 are provided with first gas permeable membranes 40; the pressure relief valves 30 are arranged in the installation holes 210 of the connecting elements 20 and can slide in the installation holes 210 under the pressure action, each pressure relief valve 30 is provided with a second channel 310 with one end communicating with the side, away from the corresponding connecting element 20 of the top cover 10, and the other end of each second channel 310 can be switched between a seal state and a pressure relief state.

Figure 4:
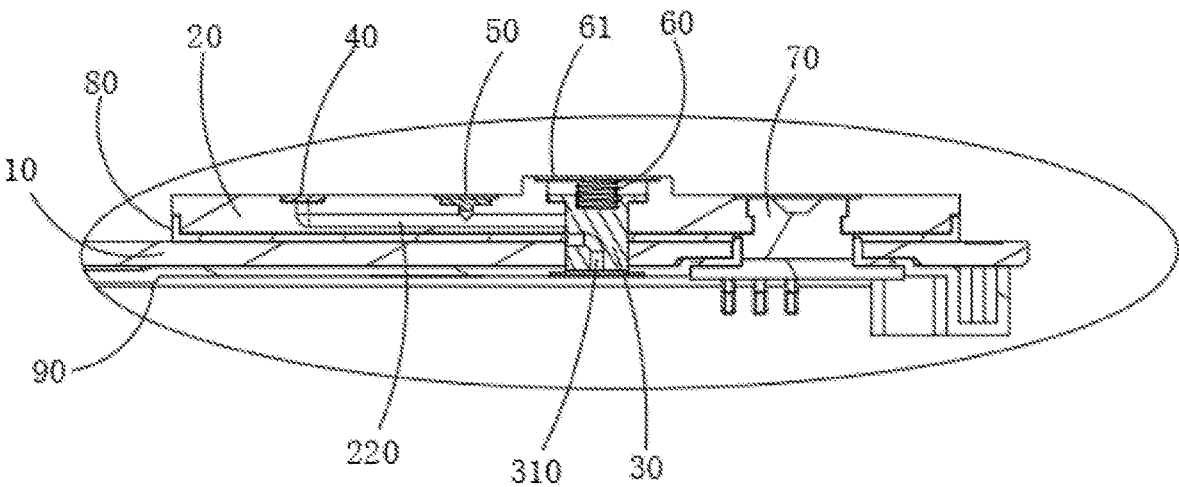
FIG. 4 is an enlarged structural schematic diagram of a portion B in FIG. 3.
Figure 5:
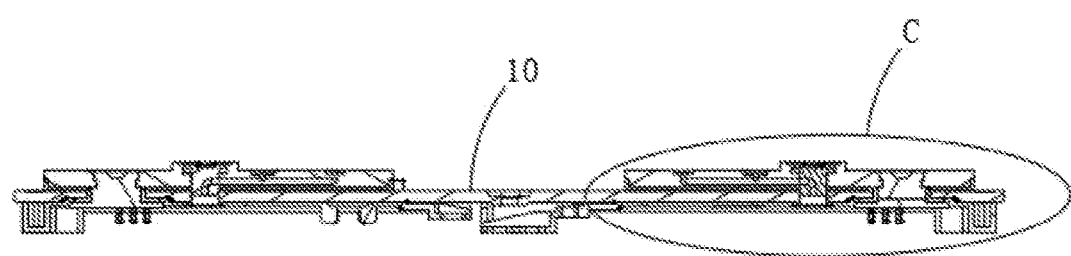
FIG. 5 is a section structural schematic diagram of the top cover assembly in the A-A direction in FIG. 2 when the pressure relief valve is used for a pressure relief state.
Figure 6:
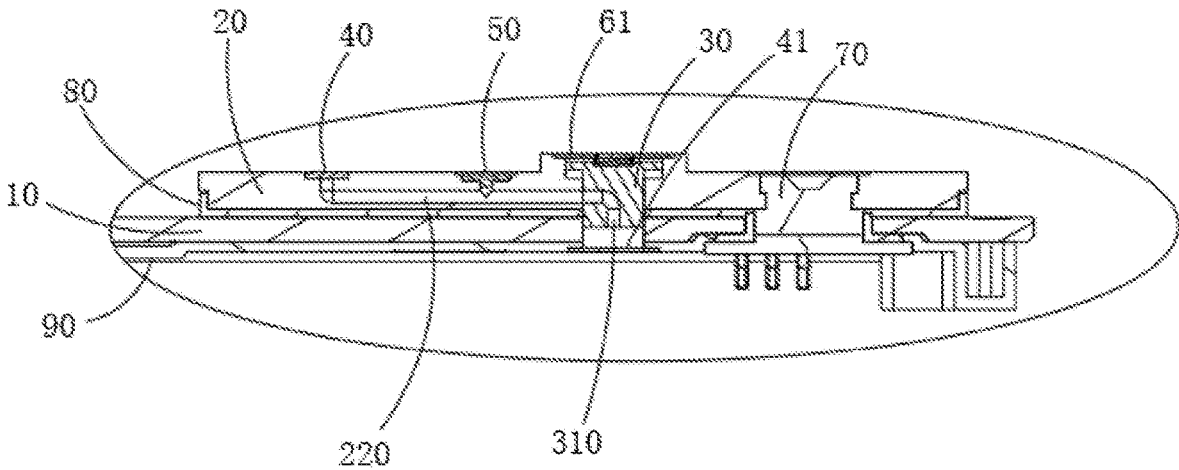
FIG. 6 is an enlarged structural schematic diagram of a portion C in FIG. 5.

In the seal state shown in FIG. 4, the other end of the second channel 310 is staggered from an opening of the first channel 220 at the hole wall of the installation hole 210;

In the pressure relief state shown in FIG. 6, the other end of the second channel 310 communicates with the opening of the first channel 220 at the hole wall of the installation hole 210 so as to release the pressure to the outside.

The connecting element 20 is a part arranged on the top cover 10 and used for fixing the pressure relief valve 30. The connecting element 20 can be fixed to the top cover 10 by welding, or can be fixed to the top cover 10 by fasteners such as bolts, or can be fixed to the top cover 10 by connecting to parts such as a terminal post 70 on the top cover 10, which is not limited in the embodiment of the present application. The connecting element 20 is provided with the installation hole 210 communicating with the through hole 110 in the top cover 10, which means that the installation hole 210 in the connecting element 20 and the through hole 110 in the top cover 10 are at least partially overlapped. The first channel 220 extending from the hole wall of the installation hole 210 to the outside on the connecting element 20 means that a body of the connecting element 20 is provided with the first channel 220, the opening in one end of the first channel 220 is located in the hole wall of the installation hole 210, and the opening in the other end of the first channel 220 is located in the position, communicating with the outside, of a surface of the connecting element 20.

The pressure relief valve 30 is a part arranged on the connecting element 20 and matched with the connecting element 20 to perform pressure relief, the pressure relief valve 30 is provided with the second channel 310, and one end of the second channel 310 communicates with the side, away from the connecting element 20, of the top cover 10, which indicates that an opening in one end of the second channel 310 arranged on a body of the pressure relief valve 30 can communicate with the side, away from the connecting element 20, of the top cover 10, and an opening in the other end can be switched between the seal state and the pressure relief state in a sliding process of the pressure relief valve 30.

When the top cover 10 is connected to the case of the battery cell, the through holes 110 formed in the top cover 10 communicate with the internal environment of the electrode assembly, the battery cell generates gas in the usage process, and along with constant increasing of the gas, the gas may push the pressure relief valves 30 through the through holes 110 formed in the top cover 10, that is, the pressure relief valves 30 can slide, under the pressure action, in the installation holes 210 of the connecting elements 20.

When the other end of the second channel 310 of the pressure relief valve 30 is staggered from the opening of the first channel 220 in the hole wall of the installation hole 210, that is, the other end of the second channel 310 of the pressure relief valve 30 is in the seal state, the pressure relief valve 30 and the connecting element 20 are in a state that the internal environment of the battery cell and the external environment are isolated, that is, the gas in the battery cell cannot flow out, through the second channel 310 of the pressure relief valve 30, to the external environment along the first channel 220 of the connecting element 20, and at the time, the pressure relief valve 30 is used for the seal state in the top cover assembly.

When the other end of the second channel 310 of the pressure relief valve 30 communicates with the opening of the first channel 220 in the hole wall of the installation hole 210, that is, the other end of the second channel 310 of the pressure relief valve 30 is in the pressure relief state, the pressure relief valve 30 and the connecting element 20 are in a state that the internal environment of the battery cell communicates with the external environment, that is, the gas in the battery cell can flow out, through the second channel 310 of the pressure relief valve 30, to the external environment along the first channel 220 of the connecting element 20, and at the time, the pressure relief valve 30 is used for the pressure relief state in the top cover assembly.

By arranging a channel-form pressure relief structure in the top cover assembly, airtightness of assembly gaps between the pressure relief valve 30 and the connecting element 20 can be ensured so that the electrolyte solution cannot easily flow out from the assembly gaps between the pressure relief valve 30 and the connecting element 20, thereby ensuring the airtightness at the pressure relief apparatus. Meanwhile, the first gas permeable membrane 40 arranged at the opening, communicating with the outside, of the first channel 220 can prevent the electrolyte solution in the battery cell from flowing out along the first channel 220 when the gas is discharged, and accordingly battery leakage caused when the electrolyte solution in the battery cell flows out of the cell from the pressure relief apparatus is prevented.

Figure 7:
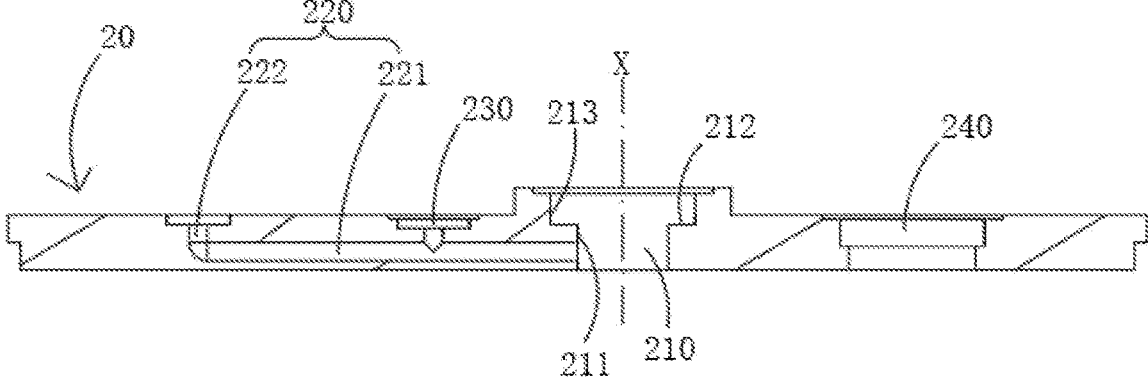
FIG. 7 is an enlarged section structural schematic diagram of a connecting element in the A-A direction in FIG. 2.

In some embodiments of the present application, optionally, as shown in FIG. 7, the first channel 220 includes a first discharge section 221 and a second discharge section 222 which communicate with each other. The first discharge section 221 communicates with the installation hole 210 and extends in a direction perpendicular to a central axis X of the installation hole 210, and the second discharge section 222 is used for communicating with the outside, and extends in a direction parallel to the central axis X of the installation hole 210.

The first discharge section 221 and the second discharge section 222 are two sections of the first channel 220, and respectively extend in the different directions on the body of the connecting element 20, and the central axis X of the installation hole 210 refers to an axis of symmetry of the installation hole 210, and is parallel to a depth direction of the installation hole 210.

By arranging the first discharge section 221 extending in the direction perpendicular to the central axis X of the installation hole 210, one end of the first channel 220 can communicate with the installation hole 210 at the hole wall of the installation hole 210, that is, the opening in one end of the first channel 220 faces the central axis X of the installation hole 210. By arranging the second discharge section 222 extending in the direction parallel to the central axis X of the installation hole 210, the other end of the second channel 310 can communicate with the outside at the side away from the top cover 10, that is, the opening in the other end of the second channel 310 faces the side, away from the top cover 10, of the connecting element 20, and accordingly, gas discharged from the first channel 220 of the connecting element 20 is conveniently collected and treated later.

In some embodiments of the present application, optionally, the connecting element 20 is provided with a fixing hole 230 communicating with the first discharge section 221, and a temperature sensing element 50 is arranged in the fixing hole 230.

The fixing hole 230 communicating with the first discharge section 221 means that the fixing hole 230 and the first discharge section 221 are at least partially overlapped, and the temperature sensing element 50 arranged in the fixing hole 230 refers to a module capable of outputting a signal as the temperature changes, such as a thermocouple, a thermistor, a bimetallic strip and a temperature sensing sheet.

When the pressure relief valve 30 and the connecting element 20 are in the pressure relief state, the temperature sensing element 50 arranged in the fixing hole 230 can sense the temperature of the gas flowing out from the first channel 220 and can transmit signals to a control system in the battery so that an electrical apparatus can receive a battery temperature abnormal signal to monitor thermal runaway of the battery. At the same time, the temperature sensing element 50 arranged in the fixing hole 230 cannot affect the discharge of the gas from the first channel 220, and if the air pressure inside the battery cell exceeds a certain threshold, the temperature sensing element 50 can be pushed away so that the first channel 220 can simultaneously release pressure to the outside from the two openings.

Figure 8:
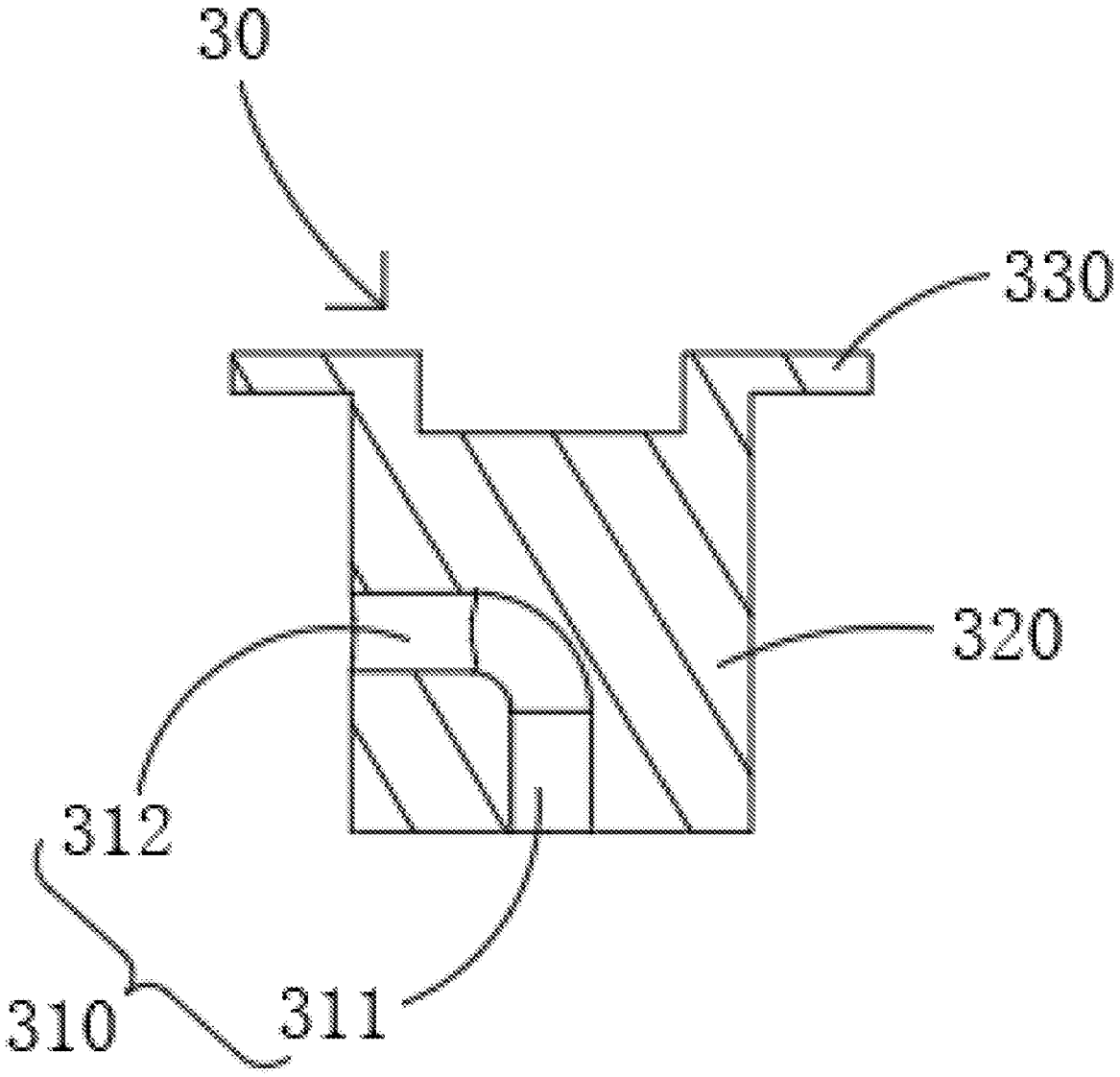
FIG. 8 is an enlarged section structural schematic diagram of the pressure relief valve in the A-A direction in FIG. 2.

In some embodiments of the present application, optionally, as shown in FIG. 8, the second channel 310 includes a first pressure relief section 311 and a second pressure relief section 312 communicating with each other, the first pressure relief section 311 further communicates with the side, away from the connecting element 20, of the top cover 10 and extends in a direction parallel to the central axis X of the installation hole 210, and the second pressure relief section 312 extends in a direction perpendicular to the central axis X of the installation hole 210.

The first pressure relief section 311 and the second pressure relief section 312 are two sections of the second channel 310, and respectively extend in different directions on the body of the pressure relief valve 30.

By arranging the first pressure relief section 311 extending in the direction parallel to the central axis X of the installation hole 210, one end of the second channel 310 can communicate with the side, away from the connecting element 20, of the top cover 10, that is, the opening in one end of the second channel 310 faces the side, away from the connecting element of the top cover 10. By arranging the second pressure relief section 312 extending in the direction perpendicular to the central axis X of the installation hole 210, that is, the opening in the other end of the second channel 310 is in the direction away from the central axis X of the installation hole 210, and the other end of the second channel 310 can be switched between the seal state and the pressure relief state when sliding relative to the hole wall of the installation hole 210.

In some embodiments of the present application, optionally, the top cover assembly further includes elastic members 60, one end of each elastic member 60 is connected to the hole wall, away from the top cover 10, of the corresponding installation hole 210, and the other end of each elastic member 60 is connected to the corresponding pressure relief valve 30.

The elastic member 60 is a part capable of recovering to the original size and shape after deformation, such as a spring and a leaf spring.

Due to the arrangement of the elastic member 60, the pressure relief valve 30 can automatically return to the original position after moving under the pressure action, thereby realizing automatic pressure relief of the battery cell.

In order to facilitate the installation of the elastic member 60 in the installation hole 210, the installation hole 210 penetrates through the body of the connecting element 20, one end of the elastic member 60 is fixed to a sealing member 61, the other end of the elastic member 60 is pressed on the pressure relief valve 30, and the sealing member 61 is fixed to the opening in the end, away from the top cover 10, of the installation hole 210, which can play a role in connecting the elastic member 60 and meanwhile seal the opening in the end, away from the top cover 10, of the installation hole 210.

In some embodiments of the present application, optionally, as shown in FIG. 8, the pressure relief valve 30 includes a main body part 320 and a protruding part 330 which are connected; as shown in FIG. 7, the installation hole 210 includes a first hole wall surface 211, a stepped surface 212 and a second hole wall surface 213 which are distributed in an axial direction, the main body part 320 of the pressure relief valve 30 is slidably connected to the first hole wall surface 211, the protruding part 330 is slidably connected to the second hole wall surface 213, and the stepped surface 212 is used for limiting a sliding position of the protruding part 330.

The main body part 320 is a main body of the pressure relief valve 30, the second channel 310 is arranged on the main body part 320 of the pressure relief valve 30, and the protruding part 330 is a portion of the body of the pressure relief valve 30 protruding out of the main body part 320.

The axial direction of the installation hole 210 refers to a depth direction of the installation hole 210. The first hole wall surface 211, the stepped surface 212 and the second hole wall surface 213 are surfaces at different positions on the hole wall of the installation hole 210, and the stepped surface 212 is a step-shaped surface formed between the first hole wall surface 211 and the second hole wall surface 213.

By arranging the main body part 320 and the protruding part 330 on the body of the pressure relief valve 30, and arranging the first hole wall surface 211, the stepped surface 212 and the second hole wall surface 213 on the hole wall of the installation hole 210, the main body part 320 can be matched with the first hole wall surface, the protruding part 330 can be matched with the second hole wall surface 213, and the stepped surface 212 can be used for limiting the protruding part 330 to only slide on the first hole wall surface 211, thereby limiting a sliding distance of the pressure relief valve 30 in the installation hole 210.

In some embodiments of the present application, optionally, the top cover assembly further includes terminal posts 70, the top cover 10 is provided with terminal post holes 120, the through holes 110 are arranged adjacent to the terminal post holes 120, and the terminal posts 70 penetrate through the terminal post holes 120 to be riveted to the connecting elements 20.

The terminal post 70 is a part arranged on the top cover 10 and electrically connected to the electrode assembly of the battery cell. The terminal post 70 arranged on the top cover 10 is divided into a positive terminal post and a negative terminal post. The positive terminal post is electrically connected to a positive pole piece tab of the electrode assembly, and the negative terminal post is electrically connected to a negative pole piece tab of the electrode assembly.

The through hole 110 in the connecting element 20 is adjacent to the terminal post hole 120 in the top cover 10 so that a fixing basis can be provided for the arrangement of the terminal post 70 on the top cover 10, that is, the terminal post 70 can penetrate through the terminal post hole 120 in the top cover 10 to be riveted to the connecting element 20, thereby fixing the terminal post 70 to the top cover 10. In addition, the pressure relief apparatus including the connecting element 20 and the pressure relief valve 30 is arranged at the location of the terminal post 70, thereby saving a space for the arrangement of an anti-explosion valve on the top cover assembly.

Here, the connecting element 20 is provided with a rivet hole 240, a hole wall of the rivet hole 240 is stepped, a side wall of the terminal post 70 is also stepped and is matched with the hole wall of the rivet hole 240 in the connecting element 20 so as to be riveted to the connecting element 20. In addition, the terminal post 70 here may be the positive terminal post or the negative terminal post, that is, the connecting element 20 may be arranged on the positive terminal post or the negative terminal post, or on both the positive terminal post and the negative terminal post, so as to realize pressure relief at the positive terminal post or the negative terminal post or both at the positive terminal post and the negative terminal post at the same time.

The connecting element 20 is riveted alone at the positive terminal post or the negative terminal post, and pressure relief can be realized alone at the location of the positive terminal post or the negative terminal post. For the battery cell generating more gas, pressure relief can be realized at the positive terminal post and the negative terminal post at the same time. The top cover assembly shown in FIG. 1 is taken as an example, if the terminal post 70 on the right side in the figure is the positive terminal post, the terminal post on the left side in the figure is the negative terminal post, and when the positive terminal post penetrates through the top cover 10 to be riveted to the connecting element 20, the pressure relief valve 30 arranged on the connecting element 20 can realize pressure relief at the location of the positive terminal post; and meanwhile, when the negative terminal post penetrates through the top cover 10 to be riveted to the connecting element 20, the pressure relief valve 30 arranged on the connecting element can realize pressure relief at the location of the negative terminal post, that is, two pressure relief valve structures corresponding to the two terminal posts are formed in the top cover assembly so as to satisfy pressure relief rate requirements of the battery cell.

In some embodiments of the present application, optionally, the top cover assembly further includes first plastic parts 80, the first plastic parts 80 are arranged between the connecting elements 20 and the top cover 10 and provided with first via holes 810 for the terminal posts 70 to penetrate through and second via holes 820 for the pressure relief valves 30 to penetrate through.

The first plastic part 80 is a part made of plastic and has good sealing performance.

By arranging the first plastic part 80, the airtightness at the contact position between the connecting element 20 and the top cover 10 can be ensured. After the terminal post 70 penetrates through the terminal post hole 120 in the top cover 10 to be riveted to the connecting element 20, the first plastic part 80 can be compressed, so that the sealing effect is achieved through the first plastic part 80.

In some embodiments of the present application, optionally, the top cover assembly further includes second plastic parts 90, the second plastic parts 90 are arranged on the sides, away from the connecting elements 20, of the top cover 10, the second plastic parts 90 are provided with third via holes 910 for the terminal posts 70 to penetrate through and fourth via holes 920 communicating with the through holes 110.

The third plastic part 90 is a part made of plastic as well, and has good sealing performance.

By arranging the second plastic part 90, the airtightness at the side, away from the connecting element 20, of the top cover 10 can be ensured. After the terminal post 70 penetrates through the third via hole 910 of the second plastic part 90, and the terminal post hole 120 in the top cover 10 is riveted to the connecting element 20, the second plastic part 90 can be compressed, so that a sealing effect is realized by the second plastic part 90.

In some embodiments of the present application, optionally, a second gas permeable membrane 41 is arranged in a fourth via hole 920.

The second gas permeable membrane 41 is similar to the first gas permeable membrane 40, which is a permeable membrane allowing the gas to pass through but blocking the liquid.

By arranging the second gas permeable membrane 41 in the fourth via hole 920 of the second plastic part 90, it can be ensured that the electrolyte solution cannot flow into the through hole 110 of the top cover 10 from the fourth via hole 920 of the second plastic part 90.

The embodiment of the present application further discloses a battery cell (not shown in the figure), including a case, an electrode assembly and the top cover assembly in the above embodiment, where the case has an inner cavity and an opening communicating with the inner cavity, the electrode assembly is arranged in the inner cavity of the case, and the top cover 10 of the top cover assembly is connected to the case and closes the opening of the case.

According to the battery cell disclosed by the embodiment of the present application, by arranging the channel-form pressure relief structure in the top cover assembly, the airtightness of the assembly gaps between the pressure relief valve 30 and the connecting element 20 can be ensured so that the electrolyte solution cannot easily flow out from the assembly gaps between the pressure relief valve 30 and the connecting element 20; and meanwhile, the first gas permeable membrane 40 arranged at the opening, communicating with the outside, of the first channel 220 can prevent the electrolyte solution in the battery cell from flowing out along the first channel 220 when the gas is discharged so as to ensure the airtightness at the pressure relief apparatus, and prevent the battery leakage caused when the electrolyte solution in the battery cell easily flows out of the cell from the pressure relief apparatus.

The embodiment of the present application further discloses a battery, including the battery cell in the above embodiment. The battery disclosed by the embodiment of the present application may be, but is not limited to be, used in an electrical apparatus such as a vehicle, a ship, or an aircraft, and a power system of the electrical apparatus can be formed by a battery module disclosed by the present application.

The embodiment of the present application further provides an electrical apparatus, including the battery in the above embodiment, and the battery is used for providing electric energy for the electrical apparatus. The electrical apparatus disclosed by the embodiment of the present application may be, but is not limited to be, a mobile phone, a tablet personal computer, a laptop, an electric toy, an electric tool, a battery vehicle, an electric vehicle, the ship, a spacecraft, etc. The electric toy may include fixed or mobile electric toys, such as game consoles, electric car toys, electric ship toys, electric airplane toys, etc. The spacecraft may include airplanes, rockets, space shuttles, spaceships, etc.

According to some embodiments of the present application, the present application provides the top cover assembly. The body of the connecting element 20 is provided with the first channel 220, the opening in one end of the first channel 220 faces the central axis X of the installation hole 210, the opening in the other end of the first channel 220 faces the side away from the top cover 10, and the opening, communicating with the outside, of the first channel 220 is provided with the first gas permeable membrane 40; the body of the pressure relief valve 30 is provided with the second channel 310, the opening in one end of the second channel 310 faces the side, away from the connecting element 20, of the top cover 10, and the opening in the other end of the second channel 310 is arranged away from the central axis X of the installation hole 210; the pressure relief valve 30 is installed in the installation hole 210 of the connecting element 20 through the spring, the connecting element 20 is provided with the fixing hole 230 communicating with the first channel 220, the temperature sensing element 50 is arranged in the fixing hole 230, and after being sleeved with a sealing ring 71, the terminal post 70 sequentially penetrates through the third via hole 910 in the second plastic part 90, the through hole 110 in the top cover 10 and the first via hole 810 in the first plastic part 80 to be riveted to the connecting element 20, one connecting element 20 is riveted to each of the positive terminal post 70 and the negative terminal post 70 on the top cover 10, and the second gas permeable membrane 41 is arranged in the fourth via hole 920 of the second plastic part 90.

Finally, it should be noted that the above embodiments are merely used for illustrating rather than limiting the technical solutions of the present application; although the present application has been described in detail with reference to the above various embodiments, those of ordinary skill in the art should understand that the technical solutions recorded in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various embodiments can be combined in any manner as long as there is no structural conflict. The present application is not limited to the specific embodiments disclosed herein, but includes all technical solutions falling within the scope of the claims.

What is claimed is:

1. A top cover assembly, comprising:
   a top cover configured to be connected to a case of a battery cell and provided with a through hole;
   a connecting element arranged on the top cover and provided with an installation hole communicating with the through hole and a first channel extending to an outside from a hole wall of the installation hole, wherein an opening, communicating with the outside, of the first channel is provided with a first gas permeable membrane; and a pressure relief valve arranged in the installation hole, configured to slide in the installation hole under a pressure, and provided with a second channel, wherein one end of the second channel communicates with a side, away from the connecting element, of the top cover, and another end of the second channel is configured to be switched between:

a seal state, in which the other end of the second channel and an opening, in the hole wall of the installation hole, of the first channel are staggered; and a pressure relief state, in which the other end of the second channel communicates with the opening, in the hole wall of the installation hole, of the first channel so as to release pressure to the outside.

2. The top cover assembly according to claim 1, wherein: the first channel comprises a first discharge section and a second discharge section communicating with each other, the first discharge section communicates with the installation hole and extends in a direction perpendicular to a central axis of the installation hole, and the second discharge section is configured to communicate with the outside, and extends in a direction parallel to the central axis of the installation hole.

3. The top cover assembly according to claim 2, wherein: the connecting element is provided with a fixing hole communicating with the first discharge section, and a temperature sensing element is arranged in the fixing hole.

4. The top cover assembly according to claim 1, wherein: the second channel comprises a first pressure relief section and a second pressure relief section communicating with each other, the first pressure relief section further communicates with the side, away from the connecting element, of the top cover and extends in a direction parallel to a central axis of the installation hole, and the second pressure relief section extends in a direction perpendicular to the central axis of the installation hole.

5. The top cove assembly according to claim 1, further comprising:

an elastic member, wherein one end of the elastic member is connected to the hole wall, away from the top cover, of the installation hole, and another end of the elastic member is connected to the pressure relief valve.

6. The top cover assembly according to claim 1, wherein: the pressure relief valve comprises a main body part and a protruding part which are connected, the installation hole comprises a first hole wall surface, a stepped surface, and a second hole wall surface which are distributed in an axial direction, the main body part is slidably connected to the first hole wall surface, the protruding part is slidably connected to the second hole wall surface, and the stepped surface is configured to limit a sliding position of the protruding part.

7. The top cover assembly according to claim 1, further comprising:

a terminal post;

wherein the top cover is provided with a terminal post hole, the through hole is adjacent to the terminal post hole, and the terminal post penetrate through the terminal post hole and is riveted to the connecting element.

8. The top cover assembly according to claim 1, further comprising:

a plastic part, wherein the plastic part is arranged between the connecting element and the top cover and provided with a first via hole for the terminal post to penetrate through and a second via hole for the pressure relief valve to penetrate through.

9. The top cover assembly according to claim 1, further comprising:

a plastic part, wherein the plastic parts is arranged on the side, away from the connecting elements, of the top cover, and the plastic part is provided with a first via hole for the terminal post to penetrate through and a second via hole communicating with the through hole.

10. The top cover assembly according to claim 9, wherein: a second gas permeable membrane is arranged in the second via hole.

11. A battery cell, comprising:

a case having an inner cavity and an opening communicating with the inner cavity;

an electrode assembly arranged in the inner cavity; and the top cover assembly according to claim 1, wherein the top cover of the top cover assembly is connected to the case and closes the opening.

12. An electrical apparatus, comprising:

the battery cell according to claim 11.

* * * * *